(12) United States Patent
Jeong (10) Patent No.: US 6,285,819 B1
(45) Date of Patent: Sep. 4, 2001

(54) METHOD AND APPARATUS FOR INTERACTIVELY CHANGING AN EEPROM DATA OF A VIDEO CASSETTE TAPE RECORDER

(75) Inventor: Byoung-Chul Jeong, Kyeongki-Do (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/060,471

(22) Filed: Apr. 15, 1998

(51) Int. Cl.[7] .............................. H04N 5/91; H04N 7/00; H04N 5/50; H04N 5/44; G11B 15/18; G11B 17/00; G11B 19/02

(52) U.S. Cl. .............................. 386/46; 360/69; 348/569; 348/734

(58) Field of Search .................................. 386/1, 46, 45, 386/83, 125, 126; 360/69; 348/734, 569, 570

(56) References Cited

U.S. PATENT DOCUMENTS 5,173,778 * 12/1992 Sasaki et al. ......................... 348/569
5,253,067 * 10/1993 Chaney et al. ....................... 348/570
5,382,983 * 1/1995 Kwoh et al. ......................... 348/569
5,506,892 4/1996 Kojima et al. .
5,774,187 * 6/1998 Tsunoda ............................... 348/569

* cited by examiner

*Primary Examiner*—Wendy R. Garber
*Assistant Examiner*—Po-Lin Chieu
(74) *Attorney, Agent, or Firm*—Pillsbury Winthrop LLP (57) ABSTRACT

Method and apparatus for interactively changing an EEPROM data of a video cassette tape recorder. A service menu picture of a service mode is displayed on a television screen if the service mode is selected in response to a first remote controller input. An EEPROM data change menu picture is displayed on the television screen if an EEPROM data change mode in the service menu picture is selected in response to a second remote controller input. A characteristic value selection picture of a driving apparatus for projecting lenses of a three dimensional projector selected item is displayed on the television screen if the item in the EEPROM data change menu picture is selected in response to a third remote controller input. Then, EEPROM data are changed to a selected characteristic value if the characteristic value in the characteristic value selection picture is selected in response to a fourth remote controller input.

12 Claims, 6 Drawing Sheets

METHOD AND APPARATUS FOR INTERACTIVELY CHANGING AN EEPROM DATA OF A VIDEO CASSETTE TAPE RECORDER

BACKGROUND OF THE INVENTION

1. Field of the Invention

The present invention relates to a service mode of a video cassette tape recorder, and more particularly to a method and an apparatus for interactively changing an EEPROM data in a video cassette tape recorder following instructional pictures on a television screen by using a remote controller during a test or a repair thereof without any special instruments.

2. Description of the Prior Art

A video cassette tape recorder is designed and manufactured with a spec adequate to a received television broadcasting type such as an NTSC, a PAL and a SCECAM. Accordingly, manufacturers of the video cassette tape recorder adopt a scheme for improving a productivity by a unification and a standardization of components thereof in order to produce various productions adequate to various broadcasting type in one processing line.

Following the technical trends as mentioned above, the video cassette tape recorder adopts an integration of circuit components and a microcomputer control method and adopts a serial transmission method by which each circuit block and the microcomputer transfer a data therebetween. By adopting the serial transmission method, a circuit characteristic of a circuit block is easily changed according to various options. An option spec of each circuit block is standardized as a table so that an option data adequate to a set is set into an EEPROM with reference to the standardized table in producing and assembling levels.

U.S. Pat. No. 5,506,892 discloses a technique for rewriting the EEPROM data of the video cassette tape recorder by Local Application Control bus System (LANC).

As described above, since the conventional EEPROM data can be changed in a state where a special instrument such as a computer is connected to the set, the EEPROM data cannot be changed where there is no special instrument. So, there are obstacles in carrying out an operation at a laboratory, a test of a processing line and an after service.

More particularly, when the worker goes to a consumer's home to service the product, and if an error is detected, the worker cannot change circuit parameters at the place and must carry the set to an after-service center. So, the after service cannot be promptly carried out, and also takes an increased after service charge therewith. Also, a special instrument such as a computer must be used, which requires a trained technician.

SUMMARY OF THE INVENTION

The present invention is intended to overcome the above described disadvantages. Therefore, it is an object of the present invention to provide a method and an apparatus for interactively checking an error of a video cassette tape recorder without any special instruments.

In order to achieve the object of the present invention, there is provided a method for interactively changing an EEPROM data of a video cassette tape recorder, which comprises displaying a service menu picture of a service mode on a television screen if the service mode is selected in response to a first remote controller input, displaying an EEPROM data change menu picture on the television screen if an EEPROM data change mode in the service menu picture is selected in response to a second remote controller input, displaying a characteristic value selection picture of a selected item on the television screen if the item in the EEPROM data change menu picture is selected in response to a third remote controller input, and changing an EEPROM data to a selected characteristic value if the characteristic value in the characteristic value selection picture is selected in response to a fourth remote controller input.

Also, in order to achieve the object of the present invention, there is provided a video cassette tape recorder, which comprises a video processing section for processing a video signal according to recorded and reproduced characteristics, an EEPROM for storing characteristic values of the recorded and reproduced characteristics of the video processing section, an input means for inputting a remote controller signal, an on-screen generating means for outputting an on-screen picture signal to a television screen after receiving an onscreen data and a control section for displaying a service menu picture of a service mode on a television screen by the on-screen generating means if the service mode is selected in response to a first remote controller input, displaying an EEPROM data change menu picture on the television screen if an EEPROM data change mode in the service menu picture is selected in response to a second remote controller input, displaying a characteristic value selection picture of a selected item on the television screen if the item in the EEPROM data change menu picture is selected in response to a third remote controller input and changing an EEPROM data to a selected characteristic value if the characteristic value in the characteristic value selection picture is selected in response to a fourth remote controller input.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Hereinafter, a method and an apparatus for interactively changing an EEPROM data of a video cassette tape recorder according to a preferred embodiment of the present invention will be explained in more detail with reference to the accompanying drawings.

Figure 1:
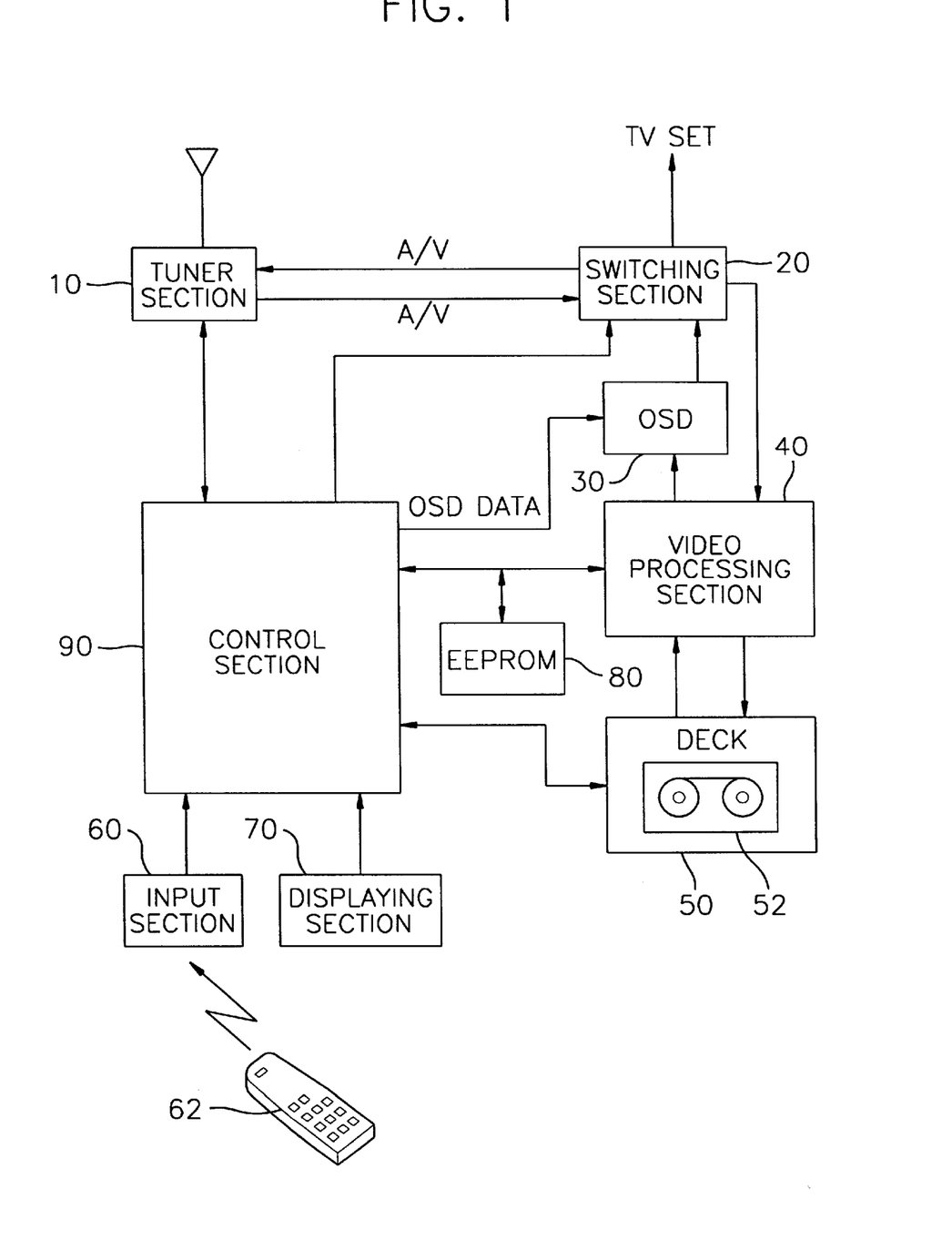
FIG. 1 is a block diagram illustrating a structure of a video cassette tape recorder according to the present invention.

FIG. 1 is a block diagram illustrating a structure of a video cassette tape recorder according to the present invention. As shown in FIG. 1, a video cassette tape recorder includes a tuner section 10, a switching section 20, an on-screen generating section 30, a video processing section 40, a deck section 50, an input section 60, a display section 70, an EEPROM 80 and a control section 90.

Tuner section 10 tunes a broadcasting signal of a channel selected among television broadcasting signal received by an antenna, demodulates the tuned signal and outputs video and audio signals. Also, tuner section 10 modulates inputted video and audio signals into a broadcasting signal of a specific channel so as to output a high frequency signal. The high frequency signal is provided as an antenna input of a television set.

Switching section 20 switches the input/output of the video and audio signals according to an operation mode. A line-output of switching section 20 is line-inputted into the television set.

On-screen generating section 30 transforms an inputted on-screen data into an RGB signal, transforms the RGB signal into a video signal and superposes the video signal on a composite video signal so as to output the same.

Video processing section 40 separates the video signal reproduced from a video cassette tape by a video reproducing head into a luminance signal (Y signal) and a color signal and signal-processes the same.

A reproduced frequency modulated signal is phase-equalized, is phase clamped and is automatically gain-adjusted. The modulated signal which is gain-adjusted is limit-processed and demodulated. A demodulated luminance signal goes through a low-pass filtering, a luminance noise reducing process and de-emphasis processing. The de-emphasis processed signal goes through a noise reducing processing and is image controlled to adjust a visibility factor thereof. Meanwhile, the reproduced frequency modulated signal goes through the low-pass filter so as to be automatically color-controlled. The color-controlled signal is transformed up from 627 KHz to 4.43 MHz. The transformed color signal goes through a band-pass filtering, a cross-talk elimination and an amplifier so as to reduce the noise therein. The image-controlled luminance signal and the noise-reduced color signal are superposed by a mixer. Then, the superposed video signal is amplified so as to be outputted as a composite video signal to on-screen generating section 30.

The video signal inputted into video processing section 40 is video-amplified and a portion of 4.43 MHz from the amplified signal is band-pass filtered. The filtered signal passes through a comfilter so as to be separated as a color signal. The separated color signal is automatically color-controlled and down-transformed to 627 KHz. The down-transformed color signal is low-pass filtered. Meanwhile, the amplified video signal is attenuated to a half thereof, is low-pass filtered and passes through a luminance noise reducing processing. The noise reduced signal emphasizes to emphasis a high frequency band and is frequency modulated. The frequency modulated signal is record-equalizing processed. Thereafter, the low-pass filtered color signal and the equalizing processed frequency modulated signal are automatically gain-processed so as to be provided to a recording head.

Video processing section 40 processes the color and luminance signals through complicated processes. During the complicated processes, circuit characteristic value is required to be adjusted in order to set adequate circuit characteristics at each process. Particularly, in the luminance noise reducing process during the recording and the reproducing, the image control process for a visibility factor of an image during the reproducing, the emphasis process for emphasizing a high frequency band during the recording, circuit parameters are need to be adjusted. In the adjustment of the circuit parameters, a serial data is decoded and then, a value of each circuit parameter of a corresponding process is adjusted.

Deck section 50 includes a capstan motor, a drum motor, a reel motor and a loading motor, and operates a loading mechanism in order to reproduce/record a video signal from/onto a video cassette tape 52.

Display section 70 includes an electron-ray indicator tube and displays a time and each operation mode state of the system.

EEPROM 80 stores system characteristic data such as a broadcasting type, a head type and recording/reproducing speed, and stores control characteristic data of recorded and reproduced video signals. The control characteristic data includes a pre-emphasis gain of the recorded signal, a ratio of a luminance signal to a noise therein (YNR) of the recorded and reproduced signals, a visibility factor of the reproduced signal, an image equalization characteristic and a record level. A pre-emphasis gain adjust data includes three steps consisting of a standard, a medium and a strong, a YNR data includes three steps consisting of a standard, a medium and a strong, and a visibility factor adjust data includes fifteen steps which are in a range of −7 dB to +7 dB.

Control section 90 includes a microcomputer. The microcomputer executes an operational program so as to control the above-described sections and executes a service mode program. Control section 90 is connected to video processing section 40 and EEPROM 80 through a serial data bus. Accordingly, video processing section 40 decodes an EEPROM data transmitted from control section 90 so as to adjust circuit parameter of each signal process according to a predetermined control characteristic.

Figure 2A:
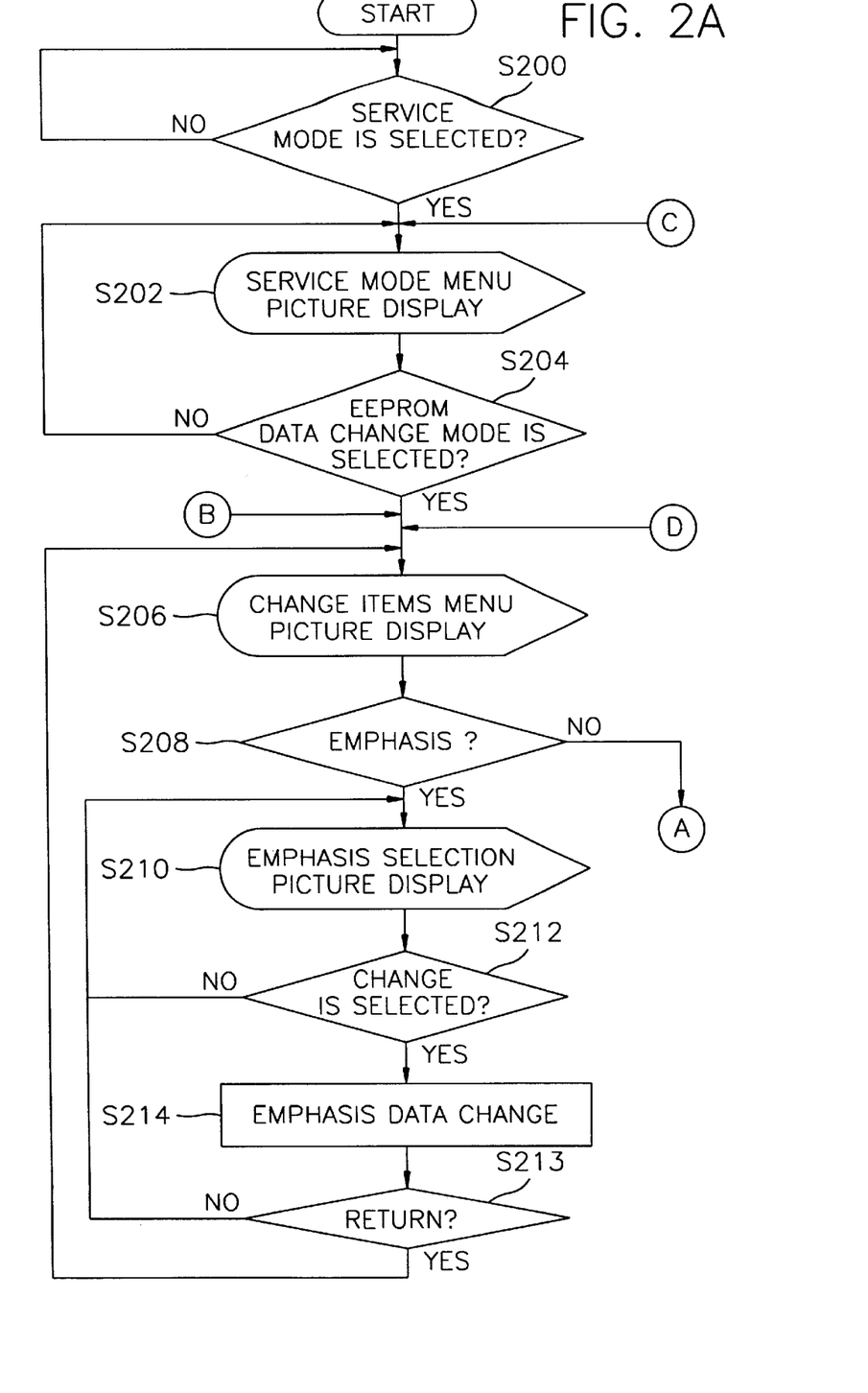
FIGS. 2A and 2B are a flowchart illustrating a method for interactively changing an EEPROM data of a video cassette tape recorder according to a preferred embodiment of the present invention.
Figure 2B:
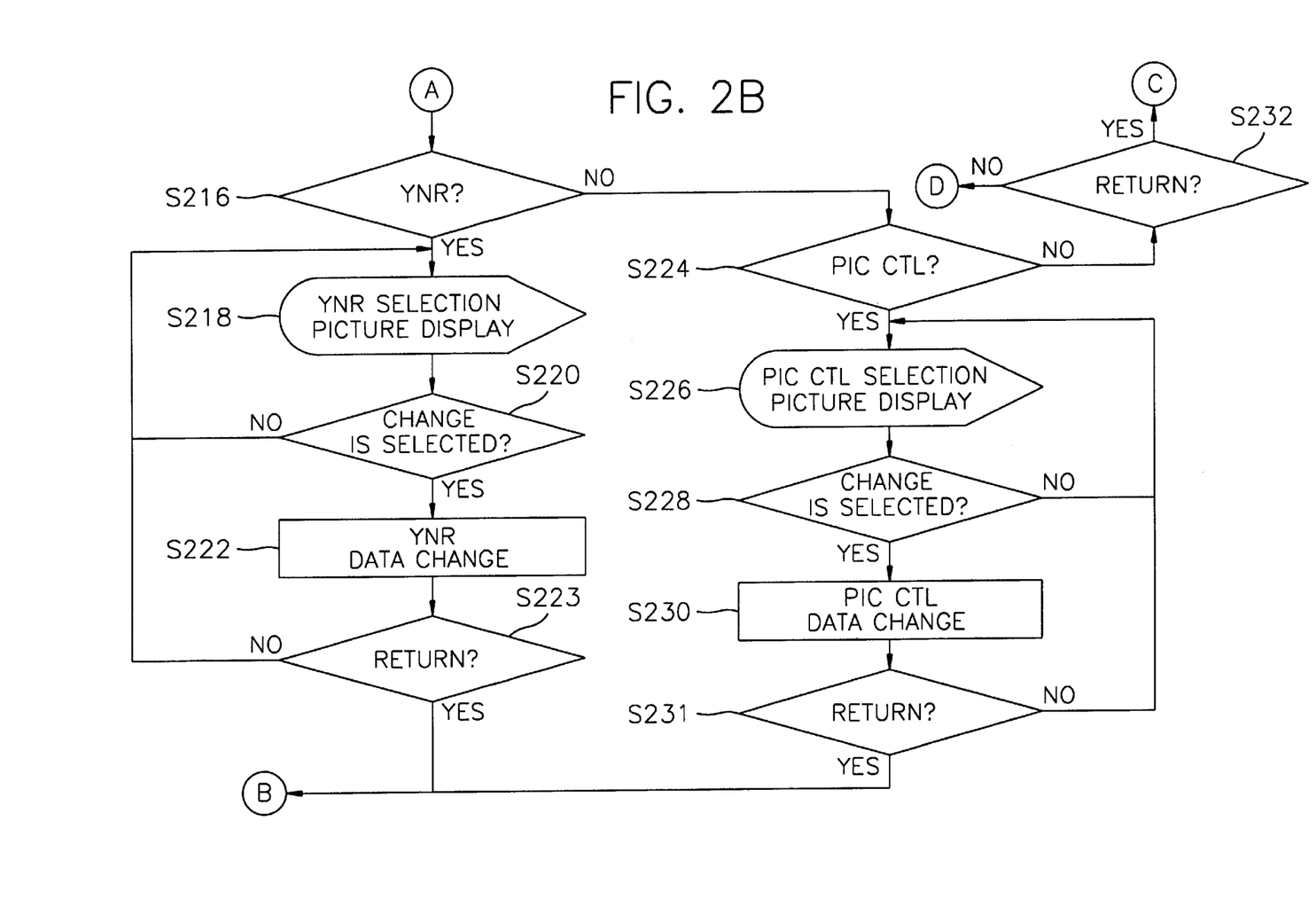

FIGS. 2A and 2B are a flowchart illustrating a method for interactively changing an EEPROM data according to a preferred embodiment of the present invention.

Repairmen execute a service mode in a state where the video cassette tape recorder is connected to the television set.

Figure 3:
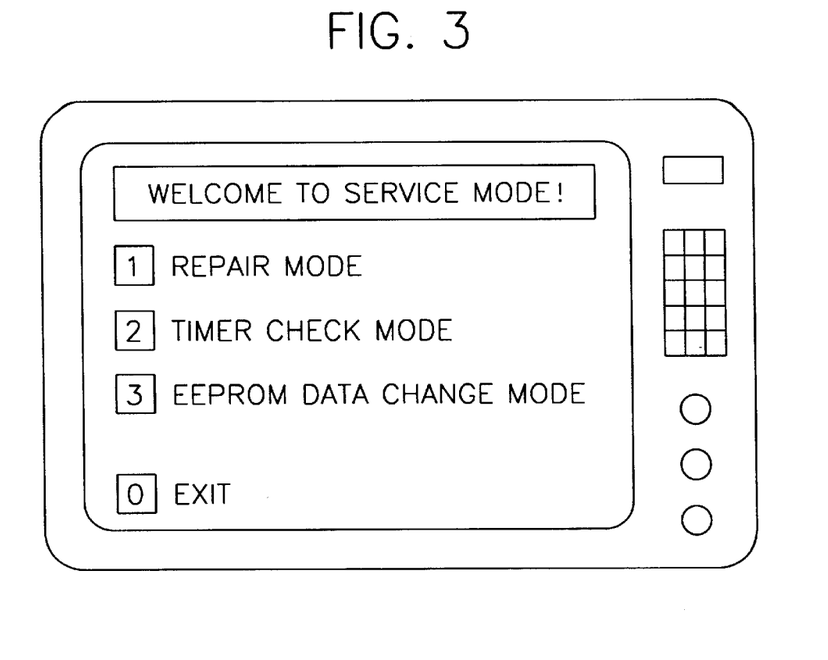
FIGS. 3 to 7 show interactive EEPROM data changing instructional pictures according to a preferred embodiment of the present invention.

As shown in FIG. 2A, a service mode program according to the present invention is accessible only by a combination of password keys known only to a specific worker such as a set developer, a test worker or a repairman. This prevents consumers from accessing the service mode. The worker pushes a menu key at first by remote controller 62 and sequentially pushes password keys such as number keys "4", "8" or "4". Input section 60 receives a key signal of remote controller 62 and transmits the same to control section 90. Control section 90 determines that a service mode is selected if the inputted key combination is identical to a preset key combination (step S200) and transmits an on-screen data to on-screen generating section 30 so as to generate a video signal. The generated video signal is transmitted to the television set through switching section 20 so as to be displayed as an on-screen picture as shown in FIG. 3 (step S202). The service mode includes generally a repair mode, a timer check mode and an EEPROM data change mode.

Figure 4:
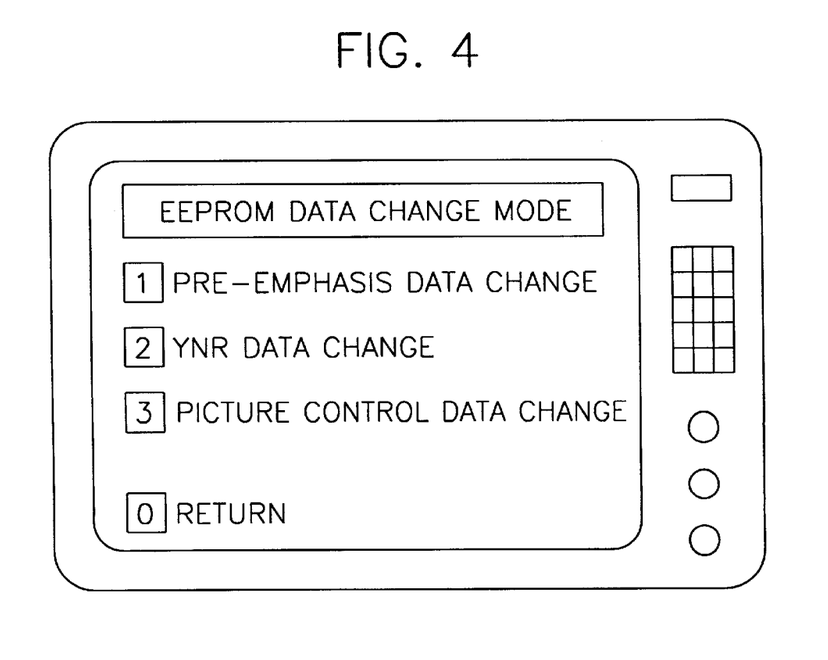

Thereafter, if the worker pushes the number key "3" by remote controller 62 in order to select the EEPROM data change mode, and then the key signal is transmitted to control section 90 as described above. Control section 90 determines that the EEPROM data change mode is selected (step S204) and transmits an on-screen data to on-screen generating section 30. Accordingly, on-screen section 30 generates a video signal. The generated video signal is transmitted to the television set through switching section 20 so as to be displayed as an on-screen picture as shown in FIG. 4 (step S206). The EEPROM data change mode includes change items such as a pre-emphasis data change, a YNR data change and a picture control data change.

If, in order to select the pre-emphasis data change item, the worker pushes the number key "1", then through a similar operation as above described, control section 90 determines that the pre-emphasis data change mode is selected (step S208) and transmits an on-screen data to on-screen generating section 30. Accordingly, on-screen section 30 generates a video signal. The generated video signal is transmitted to the television set through switching section 20 so as to be displayed as an on-screen picture as shown in FIG. 5 (step S210).

Figure 5:
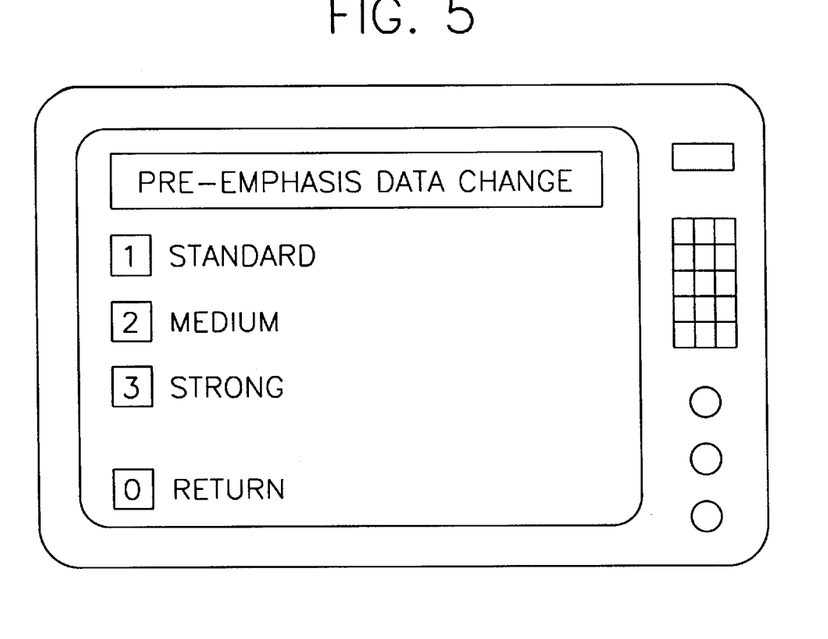

If the worker pushes a corresponding number key in order to select any one out of the standard, the medium and the strong for the emphasis gain adjust while scanning the picture shown in FIG. 5, then through a similar operation as described above, control section 90 determines that the pre-emphasis data is selected (step S212) and changes an EEPROM data to the selected data (step S214). Control section 90 checks whether there is a return command after the data change is done (step S213) and if there in none, carries out step 210. While if there is the return command, control sections control the EEPROM data change process to return to step 206.

Figure 6:
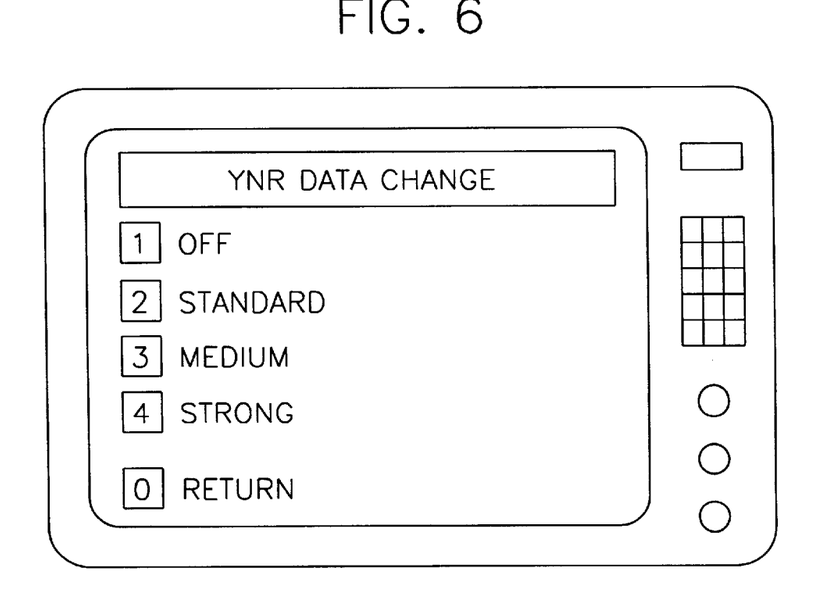

As shown in FIG. 2B, if at step 206, in order to select the YNR data change item, the worker pushes the number key "2", then through a similar operation as above-described, control section 90 determines that the YNR data change mode is selected (step S216) and transmits an on-screen data to on-screen generating section 30. Accordingly, on-screen section 30 generates a video signal. The generated video signal is transmitted to the television set through switching section 20 so as to be displayed as an on-screen picture as shown in FIG. 6 (step S218).

If the worker pushes a corresponding number key in order to select any one out of an OFF, the standard, the medium and the strong for the emphasis gain adjust while scanning the picture shown in FIG. 5, then through the same operation described above, control section 90 determines that the YNR data is selected (step S220) and changes an EEPROM data to the selected data (step S222). Control section 90 checks whether there is a return command after the data change is done(step S223) and if there in none, carries out step 218. Meanwhile if there is the return command, control sections control the EEPROM data change process to return to step 206.

If, at step 206, in order to select the picture control data change item, the worker pushes the number key "3", then through a similar operation as above-described, control section 90 determines that the picture control data change mode is selected (step S224) and transmits an on-screen data to on-screen generating section 30. Accordingly, on-screen section 30 generates a video signal. The generated video signal is transmitted to the television set through switching section 20 so as to be displayed as an on-screen picture as shown in FIG. 7 (step S226).

Figure 7:
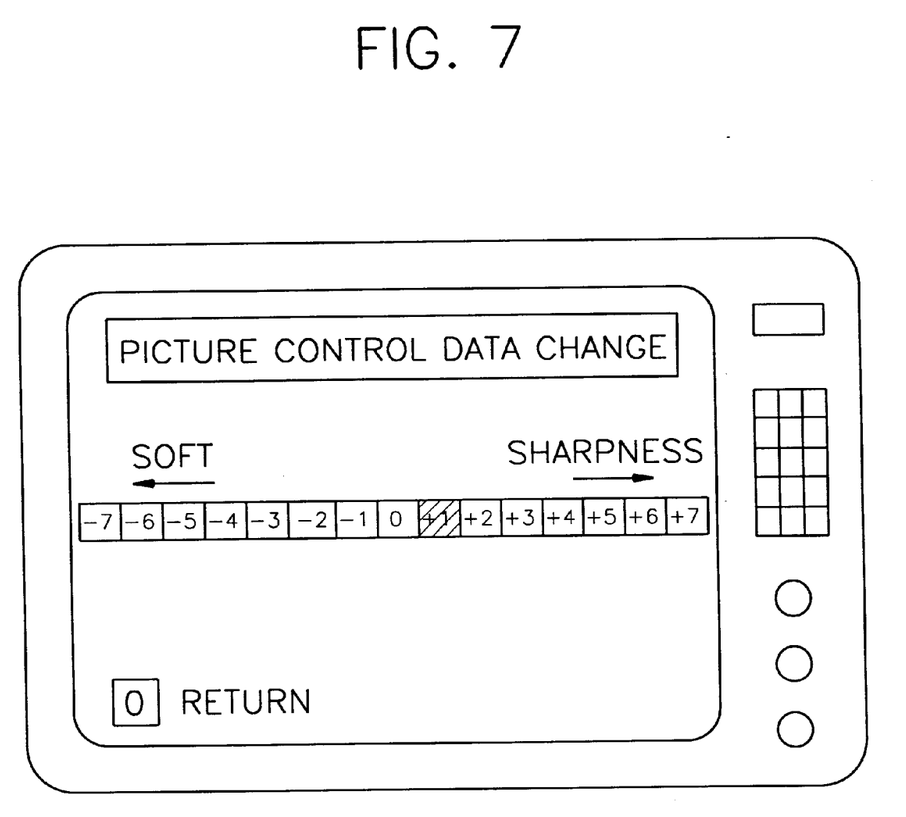

The worker positions a cursor at a desired step by manipulating left/right arrow keys in order to select any one step between −7 dB and +7 dB for the picture control adjust while scanning the picture shown in FIG. 7. Then, if the worker pushes an "OK" key at the desired step, then through the same operation described above, control section 90 determines that the picture control data is selected (step S228) and changes an EEPROM data to the selected data (step S230). Control section 90 checks whether there is a return command after the data change (step S231) and if there in none, carries out step 226. Meanwhile, if there is the return command, control sections control the EEPROM data change process to return to step 206.

In step 206, if the worker pushes the number key "0", then control section 90 carries out step 202 to return to the menu picture.

As described above, by the method and apparatus for interactively changing an EEPROM data of a video cassette tape recorder according to the present invention, the worker can easily change the EEPROM data of the video cassette tape recorder without any special test instrument at a research laboratory, a test process in the manufacturing line or a service place.

Also, even an unskilled worker can interactively carry out the changing operation by following the sequential instructions displayed on the pictures with the remote controller.

Particularly, when the worker goes to a consumer's home in order to change the control characteristic value of the set during an after-service visit, the worker can readily access the service mode by the remote controller and can change the EEPROM data so that the set does not have to be carried to an after service-center, and all service operations can be carried out at the home without any special instrument, thereby reducing a charge for the after service and providing a prompt after service.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A method for interactively changing an EEPROM data of a video cassette tape recorder, said method comprising the steps of:
   (i) displaying a service menu picture of a service mode on a television screen if the service mode is selected in response to a first remote controller input;
   (ii) displaying an EEPROM data change menu picture on the television screen if an EEPROM data change mode in the service menu picture is selected in response to a second remote controller input;
   (iii) displaying a characteristic value selection picture of a selected item on the television screen if the item in the EEPROM data change menu picture is selected in response to a third remote controller input; and
   (iv) changing an EEPROM data to a selected characteristic value if the characteristic value in the characteristic value selection picture is selected in response to a fourth remote controller input,
   wherein the EEPROM data is a control characteristic of a recorded video signal or a reproduced video signal, the control characteristic being a pre-emphasis gain of the recorded signal, a ratio of a luminance signal to a noise of recorded and reproduced signals, a visibility factor of the reproduced signal, an image equalization characteristic and a record level.

2. The method for interactively changing an EEPROM data of a video cassette tape recorder recited in claim 1, wherein in step (i), the service mode is selected by a combination of at least three remote controller inputs.

3. The method for interactively changing an EEPROM data of a video cassette tape recorder recited in claim 2, wherein the combination of at least three remote controller inputs is known only to a maker or to service workers.

4. The method for interactively changing an EEPROM data of a video cassette recorder recited in claim 1, wherein the pre-emphasis gain is selected to any one out of a standard, a medium and a strong.

5. The method for interactively changing an EEPROM data of a video cassette recorder recited in claim 1, wherein the ratio of the luminance signal to the noise is selected from any one out of a standard, a medium and a strong.

6. The method for interactively changing an EEPROM data of a video cassette recorder recited in claim 1, wherein the visibility factor is selected to a level which is in a range of −7 dB to +7 dB.

7. A video cassette recorder, which comprises:

a video processing section for processing a video signal according to recorded and reproduced characteristics;

an EEPROM for storing characteristic values of the recorded and reproduced characteristics of the video processing section;

an input means for inputting a remote control signal;

an on-screen generating means for outputting an on-screen picture signal to a television after receiving an on-screen data; and a control section for displaying a service menu picture of a service mode on a television screen by the on-screen generating means if the service mode is selected in response to a first remote controller input, displaying an EEPROM data change menu picture on the television screen if an EEPROM data change mode in the in the service menu picture is selected in response to a second remote control input, displaying a characteristic value selection picture of a selected item on the television screen if the item in the EEPROM data change menu picture is selected in response to a third remote control input and changing an EEPROM data to a selected characteristic value if the characteristic value in the characteristic value selection picture is selected in response to a fourth remote control input, wherein the EEPROM data is a control characteristic of a recorded video signal or a reproduced video signal, the control characteristic being a pre-emphasis gain of the recorded signal, a ratio of a luminance signal to a noise therein of the recorded and reproduced signals, a visibility factor of the reproduced signal, an image equalization characteristic and a record level.

8. The video cassette tape recorder recited in claim 7, wherein the service mode is selected by a combination of at least three remote control inputs.

9. The video cassette tape recorder recited in claim 8, wherein the combination of at least three remote control inputs is known only to a maker or to service workers.

10. The video cassette tape recorder recited in claim 7, wherein the pre-emphasis gain is selected to any one out of a standard, a medium and a strong.

11. The video cassette tape recorder recited in claim 7, wherein the ratio of the luminance signal to the noise is selected from any one out of a standard, a medium and a strong.

12. The video cassette tape recorder recited in claim 7, wherein the visibility factor is selected to a level which is in a range of −7 dB to +7 dB.

* * * * *